US012544793B2

(12) United States Patent
Caccia et al.

(10) Patent No.: US 12,544,793 B2
(45) Date of Patent: Feb. 10, 2026

(54) DEVICE FOR RETAINING AND REMOVING FILAMENTS OF PLASTIC MATERIAL

(71) Applicant: SYNCRO S.R.L., Busto Arsizio VA (IT)

(72) Inventors: Gabriele Caccia, Busto Arsizio VA (IT); Paolo Rizzotti, Novara NO (IT); Marco Branca, Busto Arsizio VA (IT)

(73) Assignee: SYNCRO S.R.L., Busto Arsizio Va (IT)

( * ) Notice: Subject to any disclaimer, the term of this patent is extended or adjusted under 35 U.S.C. 154(b) by 0 days.

(21) Appl. No.: 18/724,819

(22) PCT Filed: Jan. 13, 2023

(86) PCT No.: PCT/IB2023/050305
§ 371 (c)(1),
(2) Date: Jun. 27, 2024

(87) PCT Pub. No.: WO2023/135559
PCT Pub. Date: Jul. 20, 2023

(65) Prior Publication Data
US 2025/0073754 A1 Mar. 6, 2025

(30) Foreign Application Priority Data
Jan. 14, 2022 (IT) .................... 102022000000533

(51) Int. Cl.
*B07B 1/52* (2006.01)
(52) U.S. Cl.
CPC .................................. *B07B 1/526* (2013.01)

(58) Field of Classification Search
CPC ..... B07B 1/4645; B07B 1/4681; B07B 1/526; B29B 7/60
(Continued)

(56) References Cited

U.S. PATENT DOCUMENTS 993,141 A 5/1911 Bergman
2,995,775 A * 8/1961 Schnitzius .......... B29B 17/0005
209/675
(Continued)

FOREIGN PATENT DOCUMENTS

GB 2238733 A 6/1991

OTHER PUBLICATIONS

International Search Report and Written Opinion for Corresponding International Application No. PCT/IB2023/050305, 9 pages, May 15, 2023.

*Primary Examiner* — Molly K Devine
(74) *Attorney, Agent, or Firm* — LUCAS & MERCANTI, LLP

(57) ABSTRACT

A device for retaining and removing filaments of plastic material, or angel's hairs, from a flow of plastic material in form of granules, powders or flakes is disclosed. The device includes a main body defining a through channel through which the plastic material flows, a plurality of retractable elements carried by the main body and are movable between a retracted position, in which they leave the through channel unobstructed, and an extracted position, in which they protrude into the through channel for trapping the angel's hairs flowing together with the flow of plastic material along the through channel, and an actuating system for moving each retractable element between the retracted and extracted positions.

10 Claims, 10 Drawing Sheets

(58) Field of Classification Search
USPC .................................... 209/365.1, 379, 393
See application file for complete search history.

(56) References Cited

U.S. PATENT DOCUMENTS

| | | | |
|---|---|---|---|
| 4,900,498 A | | 2/1990 | Smith |
| 5,188,239 A | * | 2/1993 | Stowe ..................... B03C 1/284 |
| | | | 209/229 |
| 2002/0056773 A1 | * | 5/2002 | Zehr ..................... B02C 13/286 |
| | | | 241/73 |
| 2009/0255857 A1 | | 10/2009 | Borger |

* cited by examiner

DEVICE FOR RETAINING AND REMOVING FILAMENTS OF PLASTIC MATERIAL

CROSS-REFERENCE TO RELATED APPLICATIONS

This application is a 371 of PCT/IB2023/050305, filed Jan. 13, 2023, which claims the benefit of Italian Patent Application No. 102022000000533, filed Jan. 14, 2022.

FIELD OF THE INVENTION

The present invention relates generally to a conveyor system for conveying plastic material in form of granules, powders or flakes, for example from a storage station to a dosing station of an extrusion plant.

More particularly, the present invention relates to a device for retaining and removing the filaments of plastic material (so-called "angel's hairs") which tend to form during the transport of the plastic material, in particular because of the partial melting of the latter due to the heat generated by friction as a result of sliding against the walls of the ducts of the conveyor system, and/or which are already present among the granules, powders or flakes of plastic material as they are generated in previous production and transport steps, so as to prevent these filaments from entering the units or machines positioned downstream of the same device.

BACKGROUND OF THE INVENTION

As is well known, the formation of angel's hairs inside the plastic material that is sent to the dosing station creates several problems, in particular the obstruction of the pathways through which the material flows (for example the mouths of pipes, feeders or hoppers), the seizing of the extruder screws, disturbances in the flow of material inside the extruder cylinders, and density variations in the product (for example a plastic film) obtained with the extrusion plant.

To date, depending on the characteristics of the plastic material and the extrusion plant that is being used, it may be necessary to stop the plant several times a day to remove obstructions caused by angel's hairs, with obvious negative consequences on the yield of the plant.

Various solutions for removing the angel's hairs are known, but they all suffer from a number of drawbacks that make them not very useful or effective.

For example, US2009/0255857 teaches to place along the transport line devices for blocking and trapping the angel's hairs, such as wire meshes with an appropriate weave, through which the plastic material is caused to flow. However, this solution suffers from the drawback that the wire meshes, once they are blocked by the angel's hairs, have to be removed, cleaned and reinstalled manually.

A further known solution for removing the angel's hairs is disclosed in GB2238733A and provides for the use of a first inner cylinder and a second outer cylinder, wherein the first cylinder is provided with pins and the second cylinder has holes for the passage of such pins and is mounted eccentric to the first cylinder. However, this known solution requires the use of a motor system to rotate the two cylinders in opposite direction with respect to the flow of plastic material along the conveyor system.

A device for retaining and removing angel's hairs from a flow of granular plastic material having the features set forth in the preamble of the appended independent claim 1 is known from U.S. Pat. No. 4,900,498. According to this known solution, the device comprises a plurality of rods arranged parallel to each other and each provided with respective snagging elements configured to grasp the angel's hairs. The rods are fixed to a drawer which can be manually extracted by means of a handle to allow cleaning of the snagging elements. Such a known device therefore requires the manual intervention of an operator to clean the snagging elements.

SUMMARY OF THE INVENTION

It is an object of the present invention to provide a device for retaining and removing angel's hairs in a conveyor system for conveying plastic material in form of granules, powders or flakes, which is not affected by the drawbacks of the prior art discussed above, in particular which is capable of self-cleaning, without the need for manual intervention by an operator.

This object is fully achieved by virtue of a device as disclosed and claimed herein.

Further advantageous aspects of the device according to the invention are defined in the dependent claims, the subject-matter of which is to be understood as forming an integral part of the present description.

It is also an object of the present invention to provide a conveyor system for conveying granules, powders or flakes of plastic material comprising a device for retaining and removing angel's hairs as specified above.

By virtue of such a configuration, the device can switch, without the need for manual intervention by an operator, between an operational condition, corresponding to the extracted position of the retractable elements, in which the device is able to trap the angel's hairs, and a non-operational condition, corresponding to the retracted position of the retractable elements. Furthermore, with the movement of the retractable elements from the extracted position to the retracted position, and thus with the sliding of the retractable elements in their respective through openings, separation of the angel's hairs from the retractable elements is achieved, and therefore the device is cleaned. Therefore, the device is capable of self-cleaning, without requiring manual intervention by an operator.

According to an embodiment, the retractable elements are configured to form, when they are in the extracted position, a net trap. In this case, the device comprises a first group of retractable elements, which are arranged parallel to each other and are slidably received each in a respective hole provided in the main body, and a second group of retractable elements, which are arranged parallel to each other, as well as perpendicular and, preferably, also vertically offset from the retractable elements of the first group, and are slidably received each in a respective hole provided in the main body.

BRIEF DESCRIPTION OF THE DRAWINGS

Further features and advantages of the present invention will become clearer from the following description, made by way of non-limiting example with reference to the accompanying drawings, where.

DETAILED DESCRIPTION

Figure 1:
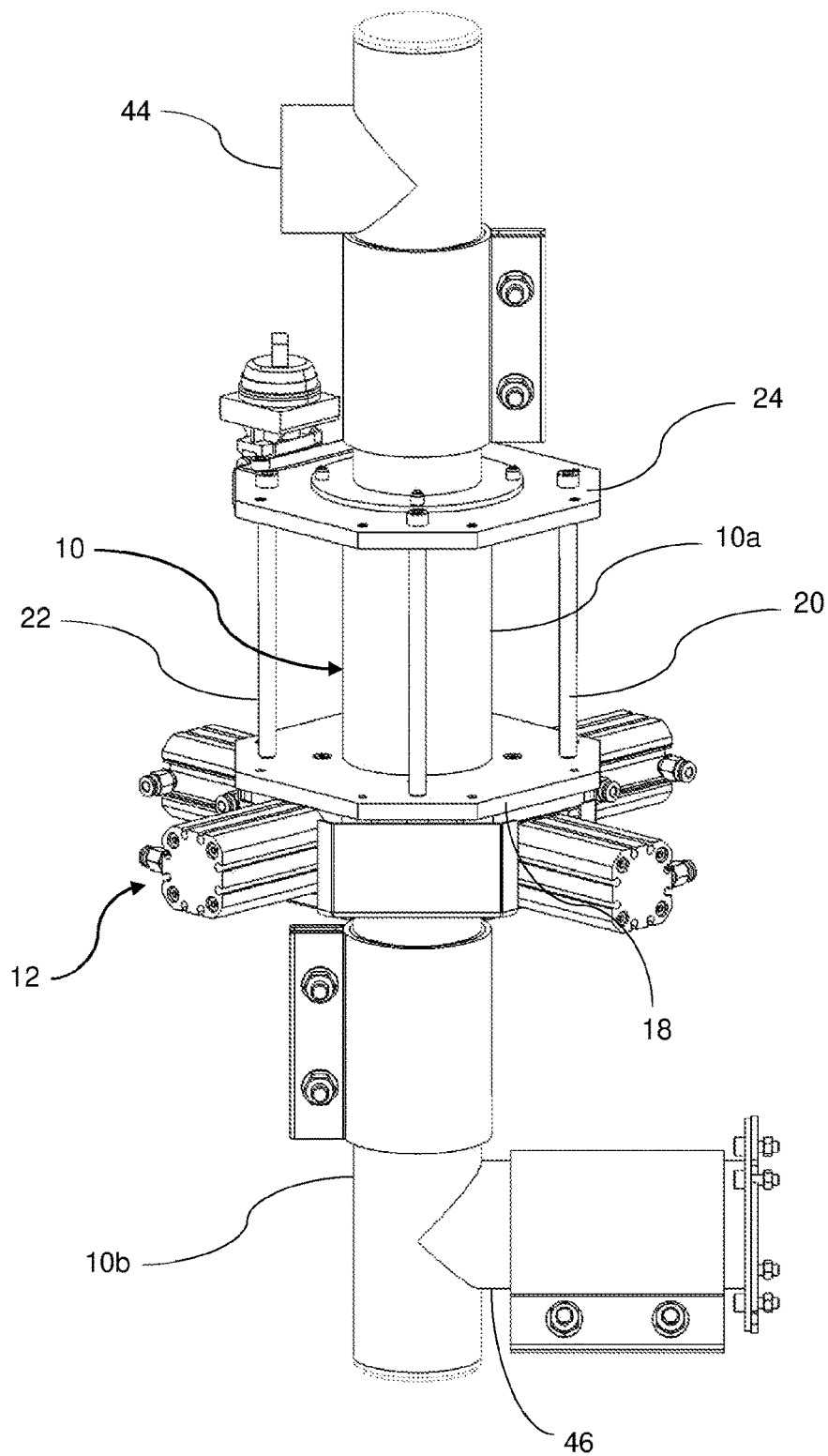
FIG. 1 is an isometric view of a duct of a conveyor system for conveying plastic material in form of granules, powders or flakes, along which a device for retaining and removing angel's hairs according to an embodiment of the present invention is installed.

Referring first to FIG. 1, numeral 10 denotes a duct forming part of a conveyor system for conveying plastic material in form of granules, powders or flakes, for example from a storage station to a dosing station of an extrusion plant. The duct 10 extends in particular in a vertical direction.

In order to trap any angel's hairs already present in the flow of plastic material and/or which may be formed, for the reasons already explained in the introductory part of the present description, during the transport of the plastic material, the duct 10 is provided with a device for retaining and removing angel's hairs (hereinafter simply referred to as the "device"), generally denoted 12.

Figure 2:
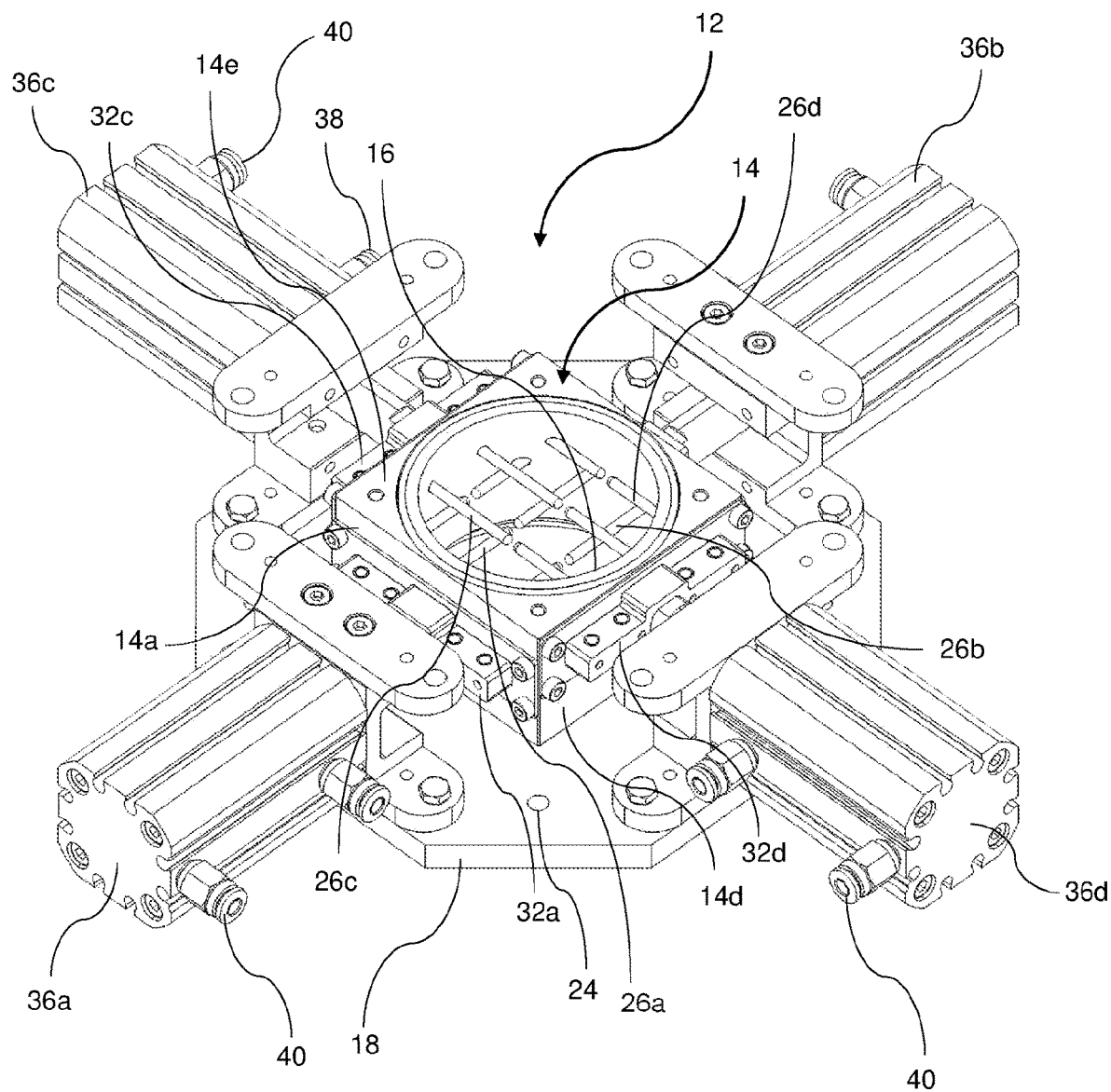
FIGS. 2 and 3 are an isometric view and a top view, respectively, of the angel's hairs retention and removal device of FIG. 1, in the operational condition of the device.
Figure 3:
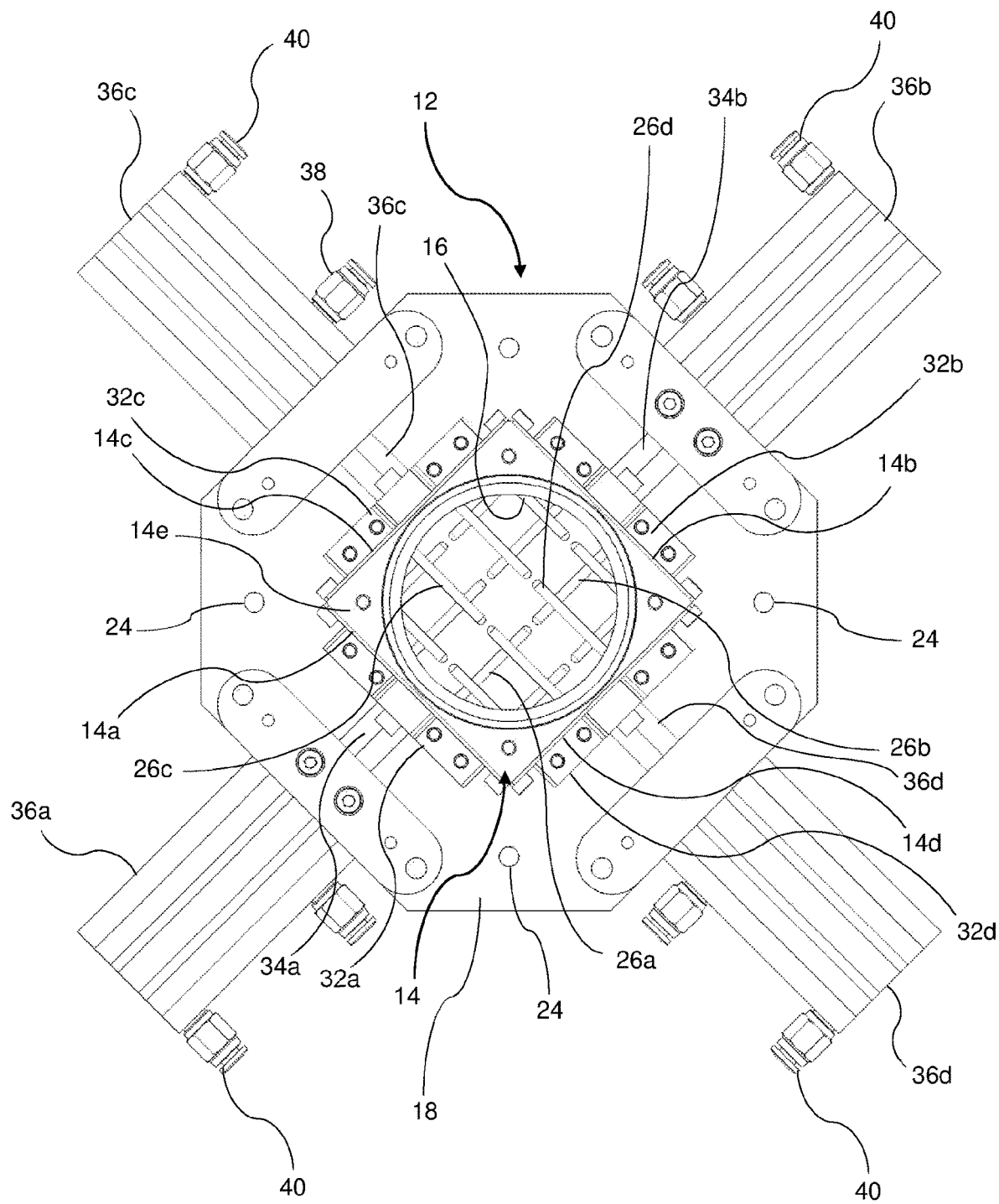
Figure 4:
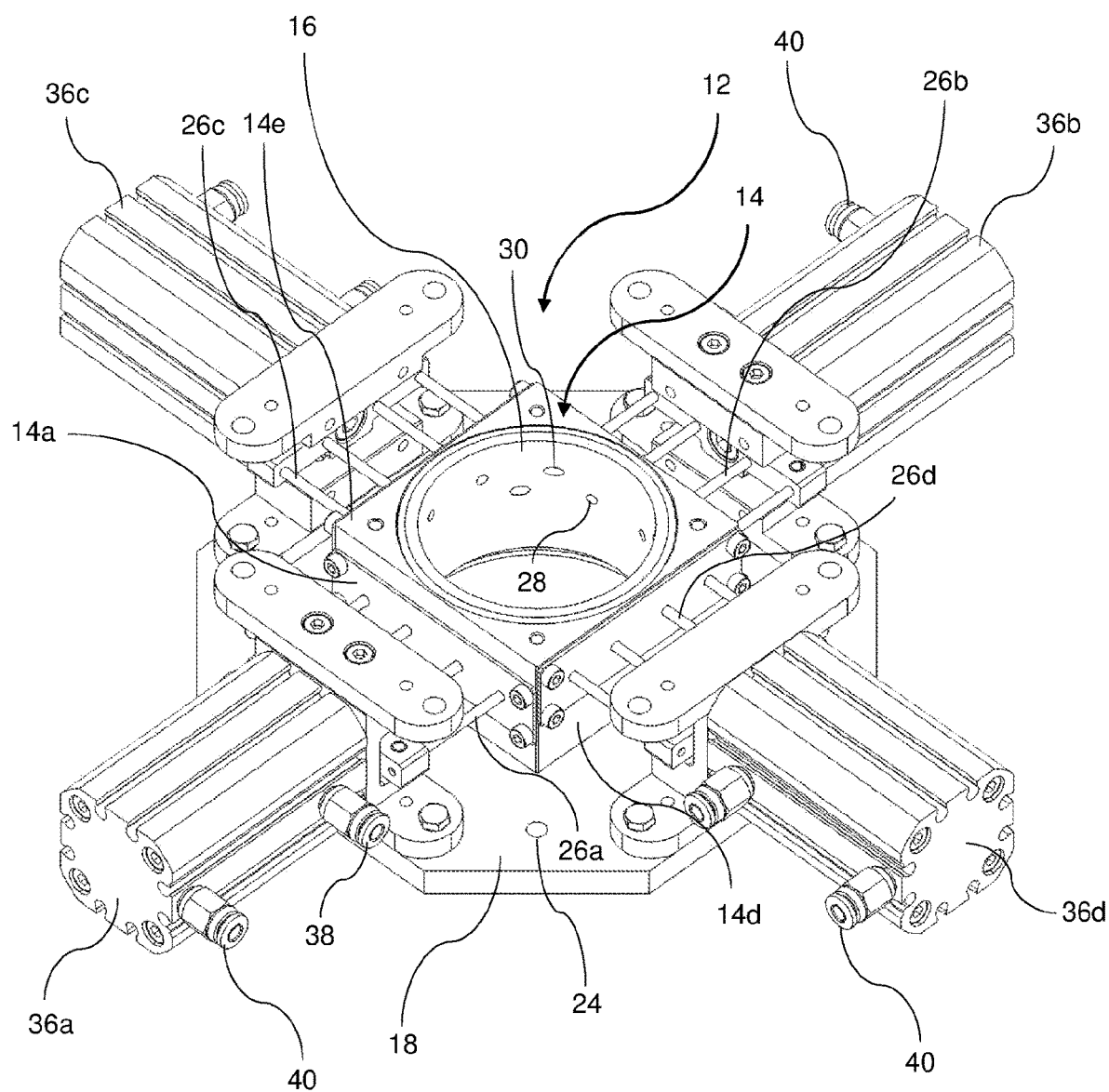
FIGS. 4 and 5 are an isometric view and a top view, respectively, of the angel's hairs retention and removal device of FIG. 1, in the non-operational condition of the device.

As shown in detail in FIGS. 2 to 4, the device 12 comprises first of all a main body 14 defining a through channel 16. In the condition in which the device 12 is mounted along the duct 10, the channel 16 is arranged coaxially to the duct 10, in particular interposed between an upper section 10a and a lower section 10b of the duct 10, in such a way that the granules, powders or flakes of plastic material flowing along the duct 10 are forced to pass also through the channel 16. For example, the main body 14 has a general parallelepiped shape, with four lateral flat faces 14a, 14b, 14c and 14d, parallel two by two, as well as with an upper flat face 14e and a lower flat face (not shown) which are oriented parallel to each other and are crossed by the channel 16.

In the illustrated embodiment, the main body 14 is mounted on a flange 18, which in turn is secured to the duct 10. For example, in the present case the duct 10 is formed by a transparent cylinder and the flange 18 is secured to it by a series of tie rods 20 extending downwards from a support flange 22 attached to the upper section 10a of the duct 10 and fitting into holes 24 provided in the flange 18. Alternatively, the flange 18 might be directly secured to the duct 10, without the need for the support flange 22 and the tie rods 20.

Figure 5:
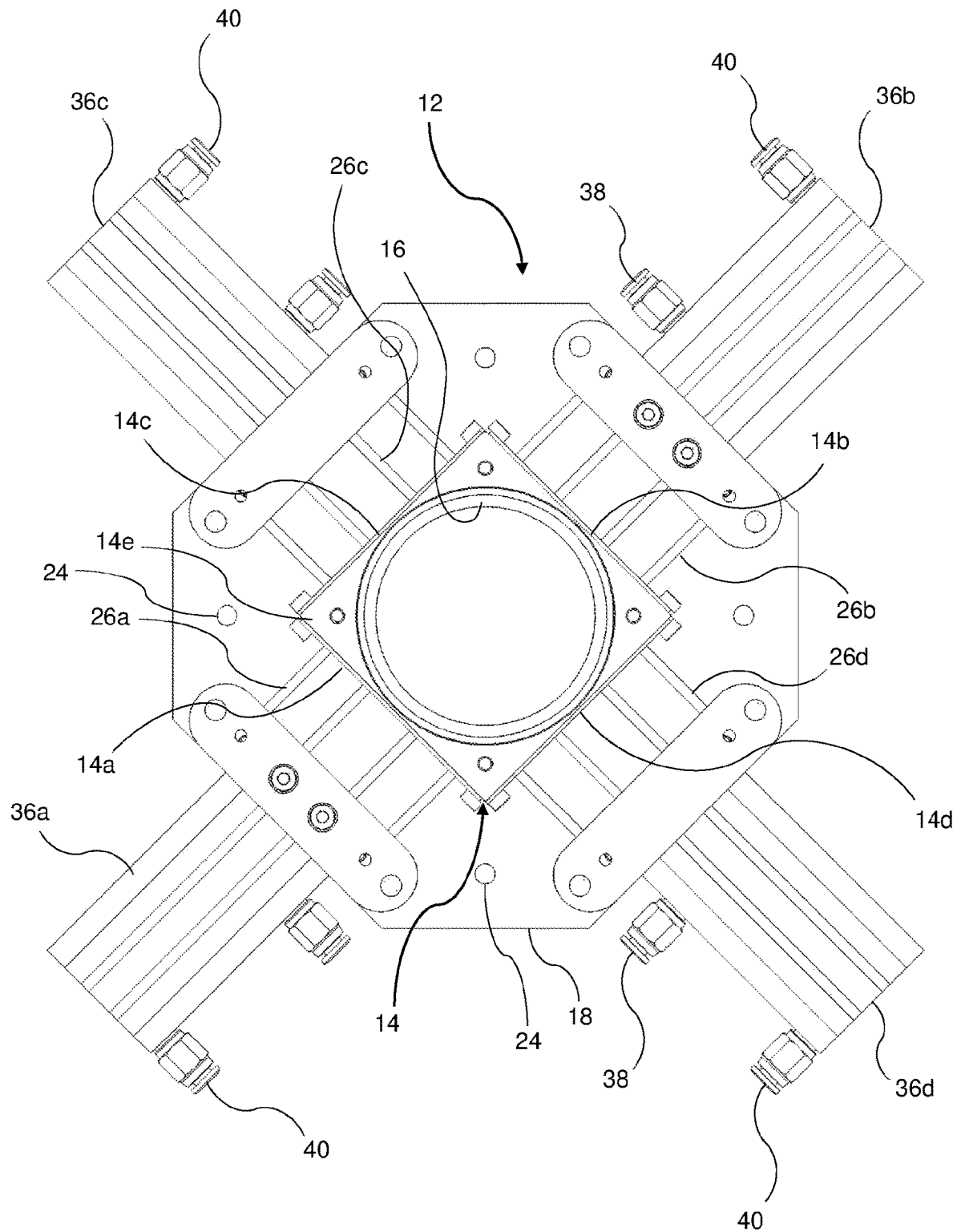

The device 12 further comprises a plurality of retractable elements 26a, 26b, 26c and 26d which are carried by the main body 14 and are movable between a retracted position (shown in FIGS. 4 and 5), in which they leave the channel 16 unobstructed, and an extracted position (shown in FIGS. 2 and 3), in which they protrude into the channel 16 so as to create a trap capable of trapping the angel's hairs flowing together with the plastic material along the channel 16, while still allowing the flow of said material.

The retractable elements 26a, 26b, 26c and 26d are elongated elements with a cross-section of any shape, in particular (although not necessarily) with a circular cross-section having a diameter of a few mm, thus preferably presenting a needle-like configuration, and are each slidably received in a respective through opening (in particular, in a respective circular hole, in the case of retractable elements with a circular cross-section) provided in the main body 14. In particular, there are provided a first group of retractable elements (formed by the retractable elements indicated with 26a and 26b), which are arranged parallel to each other, and a second group of retractable elements (formed by the retractable elements indicated with 26c and 26d), which are arranged parallel to each other and perpendicular to the retractable elements 26a and 26b of the first group. Preferably, the retractable elements 26c and 26d of the second group are also arranged vertically offset (in the present case arranged above) from the retractable elements 26a and 26b of the first group. In this way, in the extracted position (corresponding to the operational condition of the device 12) the retractable elements 26a, 26b, 26c and 26d form a net trap (as shown in FIGS. 2 and 3) which, as mentioned above, is capable of trapping the angel's hairs flowing along the channel 16 together with the plastic material. More specifically, the first group of retractable elements 26a and 26b comprises a first sub-group of retractable elements (formed by the retractable elements indicated with 26a) slidably arranged in respective holes (not shown) extending towards the channel 16 from the lateral flat face 14a of the main body 14 and a second sub-group of retractable elements (formed by the retractable elements indicated with 26b) slidably arranged in respective through openings 28 (shown in FIG. 4) extending towards the channel 16 from the lateral flat face 14b of the main body 14 opposite the face 14a. Likewise, the second group of retractable elements 26c and 26d comprises a third sub-group of retractable elements (formed by the retractable elements indicated by 26c) slidably arranged in respective holes 30 (which can be seen in FIG. 4) extending towards the channel 16 from the lateral flat face 14c of the main body 14 and a fourth sub-group of retractable elements (formed by the retractable elements indicated with 26d) slidably arranged in respective through openings (not shown) extending towards the channel 16 from the lateral flat face 14d of the main body 14 opposite the face 14c. In the embodiment proposed herein each of the aforementioned sub-groups of retractable elements comprises four elements, but of course depending on the specific application the number of retractable elements may be greater or less than four.

The through openings 28 and 30 into which the retractable elements 26b and 26c are inserted, as well as the through openings (not shown) into which the retractable elements 26a and 26d are inserted, have a cross-section of a shape and size corresponding to that of the cross-section of the retractable elements so as to allow only the respective retractable elements to pass therethrough and thus avoid the passage of any angel's hairs that may have been trapped on such elements. In this way, when the retractable elements are moved from the extracted position to the retracted position, the angel's hairs that have been trapped by said elements stop against the inner face of the channel 16, since they are prevented from entering the through openings, thereby separating from the retractable elements. The device 12 is thus able to self-clean without the need for manual intervention by an operator.

In order to prevent the angel's hairs from entering the through openings in which the retractable elements are mounted, suitable rubber or foam gaskets may be provided to seal between each retractable element and the respective through opening or, in addition or alternatively, suitable spatula-like elements may be provided to facilitate removal of the angel's hairs from the retractable elements.

The movement of the retractable elements 26a, 26b, 26c and 26d between the extracted position and the retracted position is controlled by suitable actuating means, which may be of various types, for example pneumatic actuators or electromechanical actuators, and may act on the retractable elements according to different operating logics, for example by controlling their movement simultaneously or alternately (for example, first one or more sub-groups of retractable elements and then the other sub-group or sub-groups of retractable elements), or according to more complex modes of movement.

For example, in the embodiment proposed herein, the actuating means are formed by pneumatic cylinders.

More specifically, the device 12 comprises, for each of the aforementioned sub-groups of retractable elements 26a, 26b, 26c and 26d, a respective pneumatic cylinder for controlling the simultaneous movement of all the retractable elements of that sub-group. In particular, the retractable elements 26a are fixed at their radially outermost ends to a support member 32a, which in turn is fixed to the free end of a rod 34a of a pneumatic cylinder 36a, in such a manner that controlling by means of the pneumatic cylinder 36a the axial displacement of the rod 34a in one direction or the other results in the simultaneous displacement of the retractable elements 26a in one direction or the other along the respective through openings. Likewise, the retractable elements 26b are fixed at their radially outermost ends to a support member 32b, which in turn is fixed to the free end of a rod 34b of a pneumatic cylinder 36b, in such a manner that controlling by means of the pneumatic cylinder 36b the axial displacement of the rod 34b in one direction or the other results in the simultaneous displacement of the retractable elements 26b in one direction or the other along the respective through openings. Likewise, the retractable elements 26c are fixed at their radially outermost ends to a support member 32c, which in turn is fixed to the free end of a rod 34c of a pneumatic cylinder 36c, in such a manner that controlling by means of the pneumatic cylinder 36c the axial displacement of the rod 34c in one direction or the other results in the simultaneous displacement of the retractable elements 26c in one direction or the other along the respective through openings. Finally, the retractable elements 26d are fixed at their radially outermost ends to a support member 32d, which in turn is fixed to the free end of a rod 34d of a pneumatic cylinder 36d, in such a way that controlling by means of the pneumatic cylinder 36d the axial displacement of the rod 34d in one direction or the other results in the simultaneous displacement of the retractable elements 26d in one direction or the other along the respective through openings. In a per-se-known manner, the pneumatic cylinders 36a, 36b, 36c and 36d are each provided with respective fittings 38 and 40 for connecting a first or second chamber of the cylinder with a source of compressed air, and thus the other chamber of the cylinder with an exhaust, to control the axial movement of the respective rod 34a, 34b, 34c, 34d in one direction or the other and thus cause the movement of the respective sub-group of retractable elements 26a, 26b, 26c, 26d from the retracted position to the extracted position or vice versa from the extracted position to the retracted position.

Figure 6:
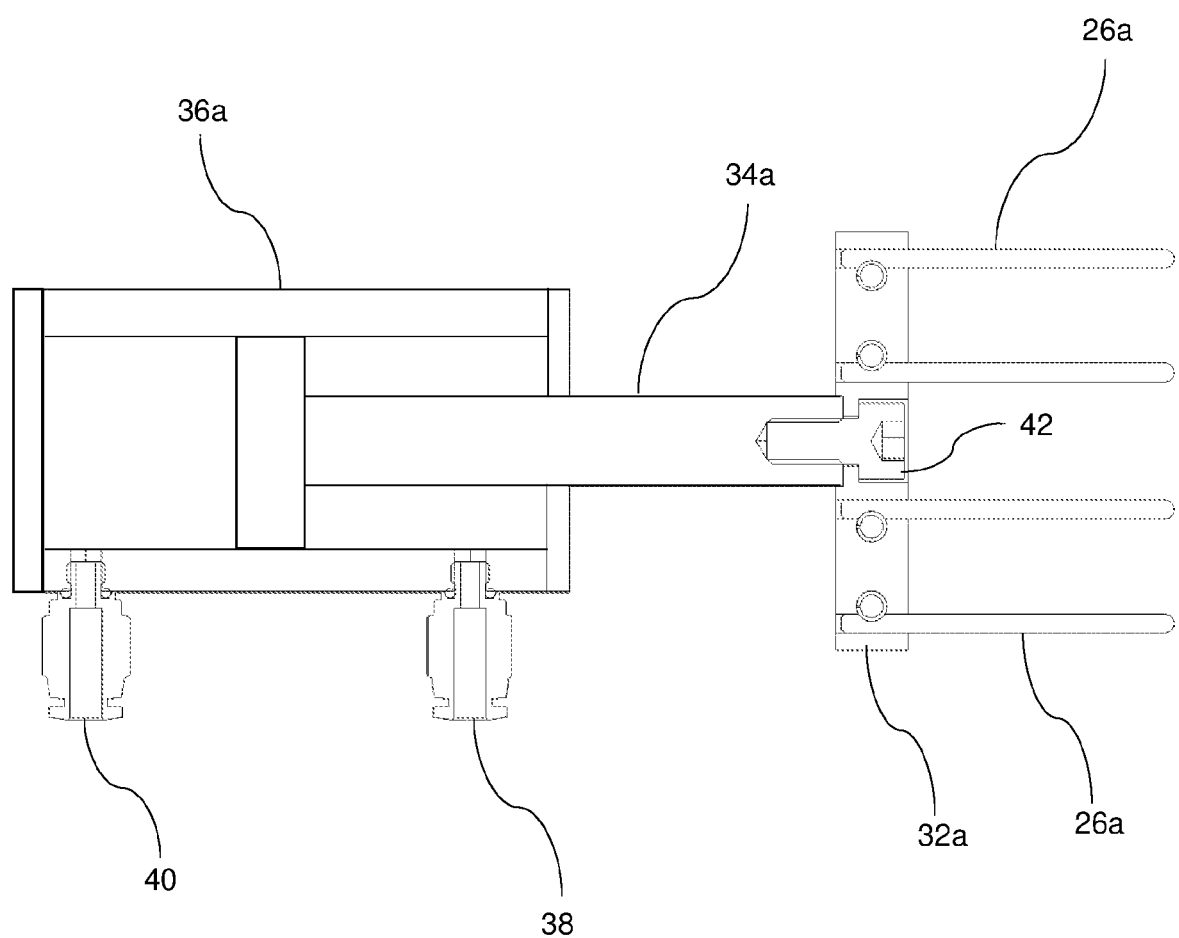
FIG. 6 is a section view schematically showing a sub-group of retractable elements of the angel's hairs retention and removal device of FIG. 1, with a respective pneumatic cylinder for controlling the movement of those elements from the extracted to the retracted position.

In this respect, FIG. 6 shows in detail the first sub-group of retractable elements 26a with the corresponding drive system, comprising the pneumatic cylinder 36a with its associated rod 34a and the support member 32a to which the retractable elements 26a are fixed. Even if in the present case a rigid connection, for example by means of a screw 42, between the support member 32a and the rod 34a is provided, a connection by means of a floating joint might alternatively be provided, in such a way as to avoid that any parallelism errors between the axis of the rod 34a and the axes of the through openings into which the retractable elements 26a are inserted generate excessive stresses on the retractable elements themselves to such an extent as to cause damage or breakage thereof.

What has been illustrated above, with reference to FIG. 6, with respect to the first sub-group of retractable elements 26a is clearly also applicable to the other sub-groups of retractable elements 26b, 26c and 26d.

Instead of a pneumatic cylinder for a group of retractable elements, as in the embodiment proposed herein, it is alternatively possible to provide for a pneumatic cylinder (or, more generally, an actuator) for each retractable element.

Referring again to FIG. 1, the flow of plastic material in form of granules, powders or flakes is fed into the duct 10 through an inlet fitting 44, for example extending horizontally, connected to the upper section 10a of the duct 10, and discharged through an outlet fitting 46, for example also extending horizontally, connected to the lower section 10b of the duct 10. During the flow of the plastic material, the device 12 is in the operational condition in which the retractable elements are in the extracted position to form a trap for trapping the angel's hairs flowing along the duct 10 together with the plastic material. In order to enable cleaning of the device 12, during the phases of interruption of the transport of the plastic material (which phases are already normally foreseen in the transport cycle of the plastic material in a plant) the retractable elements are controlled to move from the extracted position to the retracted position, so as to cause—as described above—the separation of the angel's hairs from the retractable elements. The angel's hairs thus separated are sucked by a special suction system (not shown) through the lower section 10b of the duct 10. At that point, the transport cycle of the plastic material can resume and the device 12 is returned back to the operational condition to perform its function of trapping the angel's hairs.

The conveyor system may comprise several devices 12 of the type described above. In this case, a single suction system common to all devices may be provided for, or several suction systems may be provided for, one for each device or one in common for several devices.

The cleaning process of the above-described device(s) for retaining and removing the angel's hairs is advantageously controllable automatically by the same software installed in a control unit of the conveyor system, which control unit already controls the interruption and reactivation phases of the transport of the material. In this way, no intervention by an operator is required to carry out the cleaning process.

Figure 7:
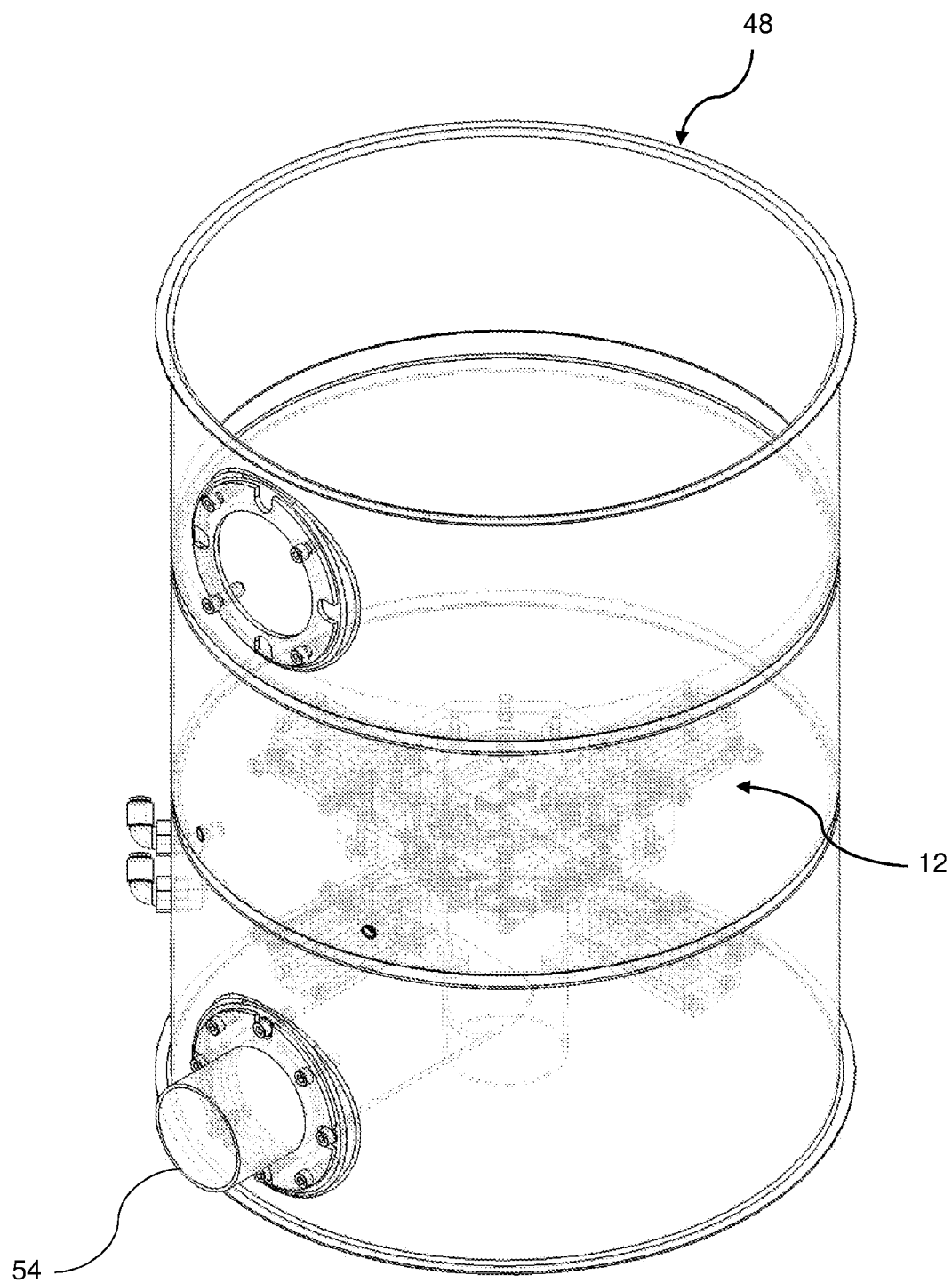
FIG. 7 is an isometric, partially phantom, view of a loading unit for loading plastic material in form of granules, powders or flakes, provided with a device for retaining and removing angel's hairs such as the one of the previous Figures.
Figure 8:
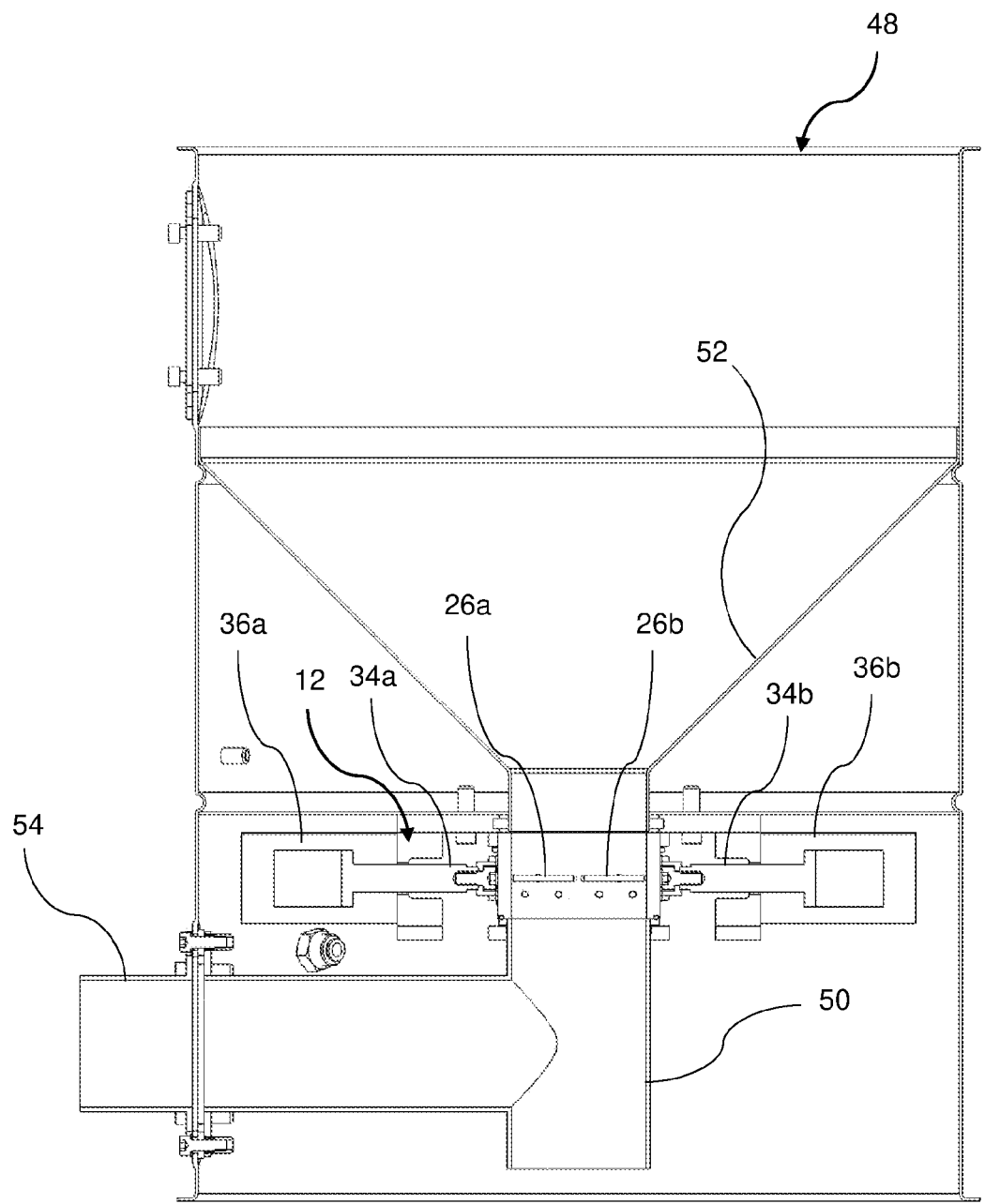
FIG. 8 is a section view of the loading unit of FIG. 7.

The device of the present invention may be installed at various points along the path of the plastic material in a conveyor system. For example, as shown in FIGS. 7 and 8, the device may also be installed within a loading and storage unit 48, of a per-se-known type, in particular along a vertical duct 50 of the unit 48 downstream of an inlet cone 52. In this case, for example, the plastic material in form of granules, powders or flakes flows downwards along the vertical duct 50, passing through the device 12, while the angel's hairs collected by the device 12 are sucked in through a horizontally extending suction duct 54 connected to the vertical duct 50 downstream of the removal device 12. The structure and operation of the device 12 shown in FIGS. 7 and 8 are similar to those of the device 12 described above with reference to FIGS. 1 to 6.

Figure 9:
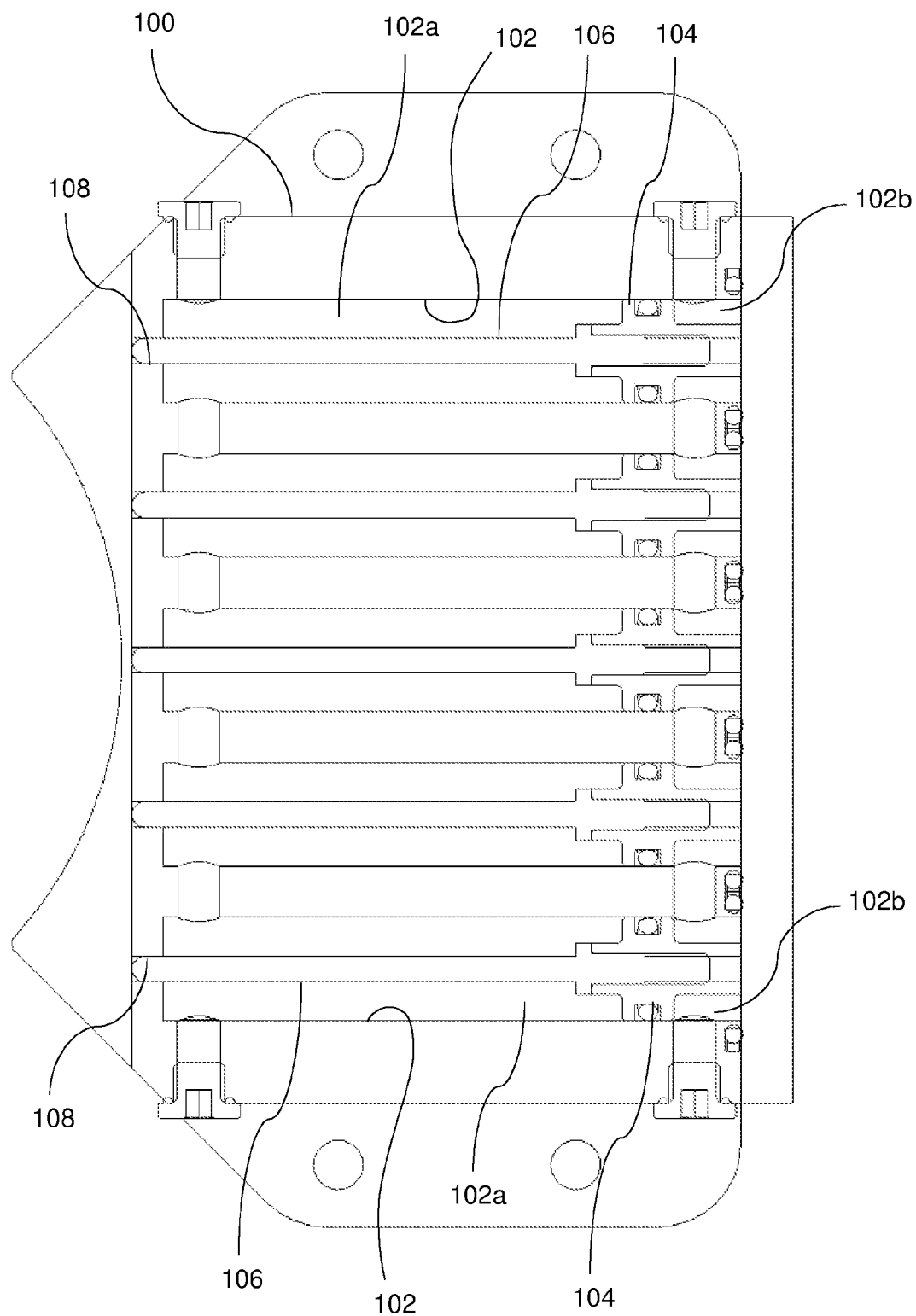
FIGS. 9 and 10 are section views of part of a device for retaining and removing angel's hairs according to a further embodiment of the present invention.
Figure 10:
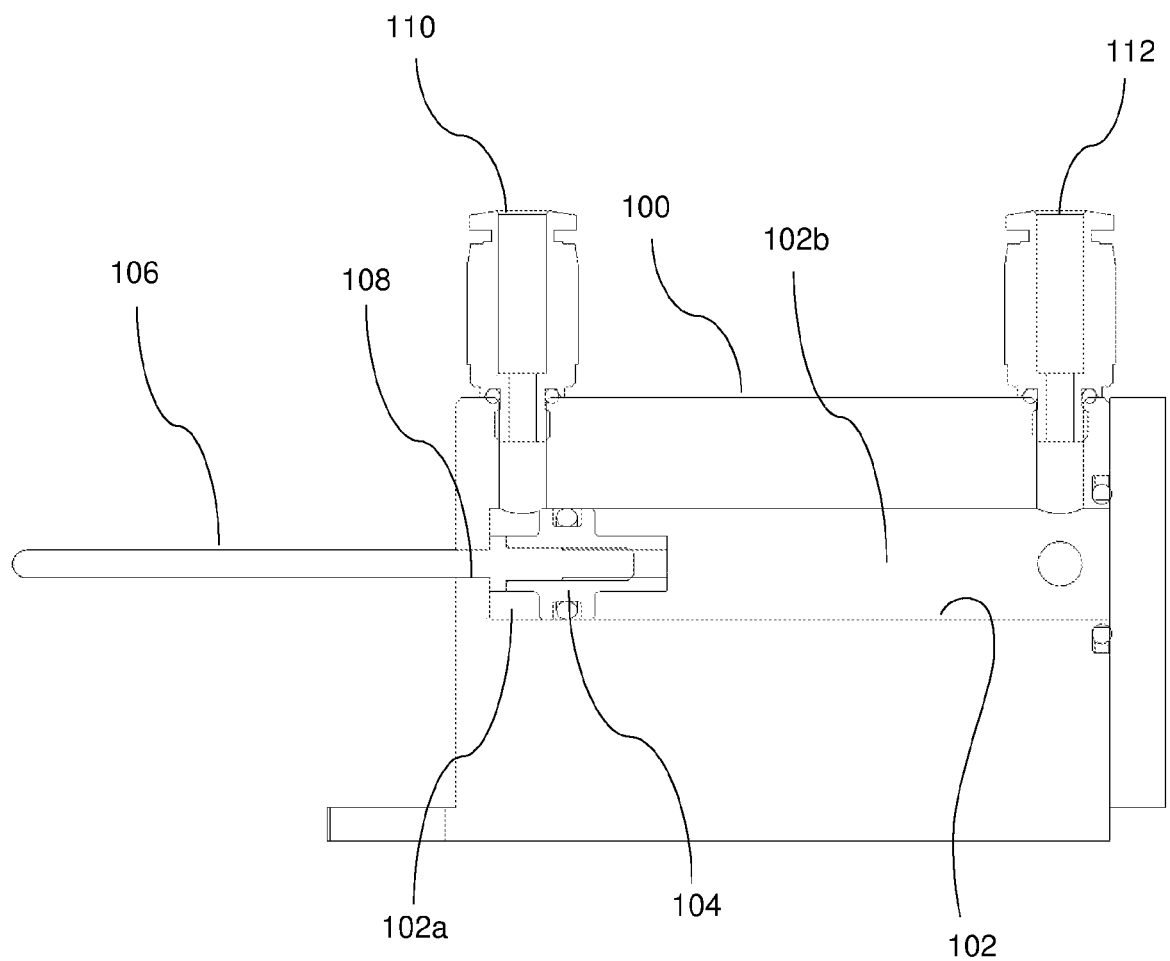

Finally, FIGS. 9 and 10 show a further embodiment of the device for retaining and removing the angel's hairs according to the present invention, which, compared to the previously illustrated embodiment, has a smaller overall size and is therefore intended to be used in particular in applications where the space available for installation of the device is rather limited. In summary, according to this embodiment, the retractable elements are still configured as elongated elements, in particular as cylindrical elements with a circular cross-section, slidably mounted in respective through openings, and are still controlled by pneumatic cylinders, as in the embodiment of FIGS. 1 to 6, but instead of being connected to the rod of the pneumatic cylinder through a support member they are each directly connected to the piston of a respective pneumatic cylinder.

With reference to FIGS. 9 and 10, the device comprises a plurality of blocks 100 (for example four blocks, only one of which is shown in those Figures), each of which has a plurality of cylindrical seats 102 arranged next to each other and oriented parallel to each other. In each cylindrical seat 102 a piston 104 is slidably received for sliding in the axial direction, which piston divides the internal volume of the cylindrical seat 102 into a first chamber 102*a* and a second chamber 102*b*. Rigidly connected to the piston 104 is a retractable element 106 which extends coaxially to the cylindrical seat 102. The block 100 also has, for each cylindrical seat 102, a respective through hole 108, in the present case a hole with a circular cross-section, which extends coaxially to the cylindrical seat 102 and is passed through by the retractable element 106. In the embodiment proposed herein the first chambers 102*a* of the cylindrical seats 102 are in fluid communication with each other and, likewise, the second chambers 102*b* of the cylindrical seats 102 are in fluid communication with each other. In this manner, all the first chambers 102*a* of the cylindrical seats 102 may be simultaneously supplied with compressed air or discharged through a first fitting 110, and, likewise, all the second chambers 102*b* of the cylindrical seats 102 may be simultaneously supplied with compressed air or discharged through a second fitting 112, so as to cause simultaneous extraction or retraction of the retractable elements 106.

By arranging four blocks 100 at 90 degrees to each other around a channel through which the plastic material in form of granules, powders or flakes is caused to flow, a net trap like the one described above with reference to the embodiment of FIGS. 1 to 6 is thus obtained when the retractable elements 106 are in the extracted position.

Of course, it is also possible to control the supply and discharge of the chambers 102*a* and 102*b* of each cylindrical seat 102 independently of each other, so as to individually control the axial movement of each retractable element 106 in one direction or the other.

The present invention has been described so far with reference to a preferred embodiment thereof. It is to be understood that other embodiments may be envisaged, which share the same inventive core as defined by the claims below.

The invention claimed is:

1. A device for retaining and removing filaments of plastic material, or angel's hairs, from a flow of plastic material in form of granules, powders or flakes, the device comprising:

a main body defining a through channel intended to be passed through by said flow of plastic material, a plurality of retractable elements which are carried by the main body and are movable between a retracted position, in which said retractable elements leave the through channel unobstructed, and an extracted position, in which said retractable elements protrude into the through channel so as to create a trap for trapping the filaments which flow together with said flow of plastic material along the through channel, and an actuating system for moving each retractable element between said retracted position and said extracted position, wherein the retractable elements are configured as elongated elements, each of which is slidably inserted into a respective through opening provided in the main body and having a cross-section of a shape and size corresponding to those of the cross-section of the respective retractable element, in such a manner that the displacement of each retractable element between said retracted position and said extracted position results in a sliding movement of the retractable element relative to the respective through opening, and wherein said plurality of retractable elements comprises:
a first group of retractable elements, which are arranged parallel to each other, and
a second group of retractable elements, which are arranged parallel to each other and not parallel to the retractable elements of said first group, in such a manner that in the extracted position the retractable elements form a net trap.

2. The device of claim 1, wherein the retractable elements and the respective through openings have a circular cross-section.

3. The device of claim 1, wherein the retractable elements of said second group are further arranged vertically offset from the retractable elements of said first group.

4. The device of claim 1, wherein said actuating system comprises a pneumatic cylinder.

5. The device of claim 4, wherein
said first group of retractable elements comprises a first sub-group of retractable elements and a second sub-group of retractable elements arranged opposite to the retractable elements of said first sub-group, wherein said second group of retractable elements comprises a third sub-group of retractable elements and a fourth subgroup of retractable elements arranged opposite to said the retractable elements of said third sub-group, and wherein said actuating system comprises a first pneumatic cylinder operatively associated with said first sub-group of retractable elements, a second pneumatic cylinder operatively associated with said second sub-group of retractable elements, a third pneumatic cylinder operatively associated with said third sub-group of retractable elements, and a fourth pneumatic cylinder operatively associated with said fourth sub-group of retractable elements.

6. The device of claim 5, wherein said actuating system further comprises:

a first support member which is mounted at a free end of a rod of said first pneumatic cylinder and to which the retractable elements of said first sub-group are fixed, a second support member which is mounted at a free end of a rod of said second pneumatic cylinder and to which the retractable elements of said second sub-group are fixed, a third support member which is mounted at a free end of a rod of said third pneumatic cylinder and to which the retractable elements of said third sub-group are fixed, and a fourth support member which is mounted at a free end of a rod of said fourth pneumatic cylinder and to which the retractable elements of said fourth sub-group are fixed.

7. The device of claim 6, wherein each of said first, second, third and fourth support members is connected to the rod of the respective pneumatic cylinder by means of a floating joint.

8. The device of claim 4, comprises, for each retractable element, a respective pneumatic cylinder having a cylindrical seat and a piston axially slidably received within said cylindrical seat, wherein each retractable element is directly connected to the piston of the respective pneumatic cylinder.

9. A conveyor system for conveying plastic material in form of granules, powders or flakes, comprising a device for retaining and removing filaments of plastic material according to claim 1.

10. The device of claim 1, wherein said second group of retractable elements are arranged perpendicular to the retractable elements of said first group.

* * * * *